(12) United States Patent
Lim et al.

(10) Patent No.: US 8,929,890 B2
(45) Date of Patent: Jan. 6, 2015

(54) METHOD AND SYSTEM FOR PROVIDING SERVICE IN A COMMUNICATION SYSTEM

(75) Inventors: Geun-Hwi Lim, Seongnam-si (KR); Nae-Hyun Lim, Yongin-si (KR); Jun-Hyung Kim, Suwon-si (KR); Yong Chang, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 1766 days.

(21) Appl. No.: 11/774,888

(22) Filed: Jul. 9, 2007

(65) Prior Publication Data

US 2008/0009283 A1 Jan. 10, 2008

(30) Foreign Application Priority Data

Jul. 7, 2006 (KR) .................. 10-2006-0063872

(51) Int. Cl.
*H04W 36/00* (2009.01)
*H04B 7/216* (2006.01)
*H04W 4/00* (2009.01)
*H04W 72/00* (2009.01)
*H04W 48/18* (2009.01)

(52) U.S. Cl.
CPC ............ *H04W 72/005* (2013.01); *H04W 48/18* (2013.01)
USPC ......... 455/435.1; 370/342; 370/331; 455/436

(58) Field of Classification Search
CPC .............................. H04W 48/18; H04W 72/005
USPC .......... 455/506, 432.1, 435.1–436, 509, 450, 455/452.2, 422.1, 428–446; 370/328–338, 370/236, 270–271, 254, 342, 455, 441
See application file for complete search history.

(56) References Cited

U.S. PATENT DOCUMENTS

| | | | | |
|---|---|---|---|---|
| 7,570,618 B2 * | 8/2009 | Son et al. | ...................... | 370/331 |
| 7,610,363 B2 * | 10/2009 | Kim et al. | ...................... | 709/220 |
| 2002/0142771 A1 * | 10/2002 | Saifullah et al. | ............. | 455/436 |
| 2003/0112789 A1 | 6/2003 | Heinonen et al. | | |
| 2004/0008657 A1 | 1/2004 | Lee et al. | | |
| 2005/0101328 A1 | 5/2005 | Son et al. | | |
| 2007/0104142 A1 * | 5/2007 | Kim | .............................. | 370/331 |
| 2007/0105557 A1 * | 5/2007 | Israelsson et al. | ............ | 455/436 |
| 2007/0253367 A1 * | 11/2007 | Dang et al. | ..................... | 370/329 |
| 2008/0037472 A1 * | 2/2008 | Ryu et al. | ...................... | 370/332 |
| 2008/0056219 A1 * | 3/2008 | Venkatachalam | ............. | 370/342 |

FOREIGN PATENT DOCUMENTS

KR 1020050020720 3/2005

* cited by examiner

*Primary Examiner* — Nizar Sivji
(74) *Attorney, Agent, or Firm* — The Farrell Law Firm, P.C.

(57) ABSTRACT

A method for providing service in a communication system. A base station (BS) receives a request message for requesting a service from a mobile station (MS) located in a first service zone; and transmits to the MS a response message including information on a BS located in a service zone supporting the requested service. The MS transmits a request message for requesting a service to the BS located in the first service zone, and receives a response message including information on a BS located in a service zone supporting the requested service, from the BS located in the first service zone.

32 Claims, 5 Drawing Sheets

METHOD AND SYSTEM FOR PROVIDING SERVICE IN A COMMUNICATION SYSTEM

PRIORITY

This application claims priority under 35 U.S.C. §119(a) to a Korean Patent Application filed in the Korean Intellectual Property Office on Jul. 7, 2006 and assigned Serial No. 2006-63872, the disclosure of which is incorporated herein by reference.

BACKGROUND OF THE INVENTION

1. Field of the Invention

The present invention relates generally to a communication system, and in particular, to a service provision method and system for seamlessly providing a Multicast and Broadcast Service (MBS) desired by a user in a communication system supporting MBS.

2. Description of the Related Art

Intensive research in the next generation communication system is being conducted to provide users with high-speed services having various Quality of Service (QoS) classes. Particularly, research and development in the next generation communication system is being carried out to support high-speed services guaranteeing mobility and QoS for a Broadband Wireless Access (BWA) communication system.

The BWA communication system provides users with high-speed multimedia communication services. MBS provides beyond the voice and packet data communicant services provided by the existing communication system. In a communication system supporting MBS, a transmitter, or a Base Station (BS), provides broadcast content data to multiple receivers, or Mobile Stations (MSs), using a multicast scheme. The multicast scheme is a scheme in which a transmitter transmits data to multiple receivers. The communication system supporting MBS divides a broadcast service zone into multiple service zones, in each of which one or more transmitters transmit MBS to all receivers located in the corresponding service zone using the multicast scheme. Therefore, the receivers located in each service zone can simultaneously receive MBS data from the transmitter. In the communication system supporting MBS, one transmitter can take charge of more than one service zones and can simultaneously provide MBS to receivers located in the corresponding service zones. With reference to FIG. 1, a description will now be made of a general Institute of Electrical and Electronics Engineers (IEEE) 802.16 compliant communication system supporting MBS.

FIG. 1 is a schematic diagram illustrating a configuration of a general IEEE 802.16 communication system supporting MBS.

Referring to FIG. 1, the IEEE 802.16e communication system has a multi-cell configuration, i.e. has a cell #1 100 and a cell #2 150, and includes a BS1 102 and a BS2 152 in charge of their associated cells 100 and 150; an MS1 104 that is located in cell #1 100 and receives a communication service from BS1 102; an MS3 154 that is located in cell #2 150 and receives a communication service from BS2 152; and an MS2 110 that is located in the boundary between cells 100 and 150, where cell #1 100 and cell #2 150 overlap each other, and receives a communication service from BS1 102 and BS2 152. It is assumed herein that MSs of MS1 104, MS2 110 and MS3 154 have both mobility and fixability, and signal exchange between BSs 102 and 152, and MSs 104, 110 and 154 located in cells 100 and 150 is achieved using Orthogonal Frequency Division Multiplexing (OFDM)/Orthogonal Frequency Division Multiple Access (OFDMA).

As the communication system provides an MBS service to users, or MSs 104, 110 and 154, MSs 104, 110 and 154 receive MBS from BSs 102 and 152 using a single-BS access scheme or a multi-BS access scheme. More specifically, the single-BS access scheme is a scheme in which an MS receives MBS from one BS in which the MS itself is registered, and the multi-BS access scheme is a scheme in which an MS receives MBS not only from a BS in which the MS itself is registered, but also from other BSs. That is, as shown in FIG. 1, MS1 104 and MS3 154 receive MBS from their associated BS1 102 and BS2 152 in which they are registered, using the single-BS access scheme, and MS2 110 receives MBS not only from BS1 102 but also from BS2 152 using the multi-BS access scheme.

In the single-BS access scheme, to receive MBS, an MS is registered in all BSs supporting the MBS. In the multi-BS access scheme, however, a connection for MBS between a BS and an MS is generated through a Dynamic Service Addition (DSA) process, or a service allocation process, and the MS acquires the connection information with the BS by receiving Type/Length/Value (TLV) encoding information for data identification from the BS.

The MS can identify an MBS zone depending on a Connection Identifier (CID) or a Security Association (SA). The MBS zone as used herein refers to a zone where an MBS flow is available depending on the CID or the SA, i.e. a predetermined zone where the MS can receive MBS. The BS broadcasts information on the MBS zone to MSs over a Downlink Channel Descriptor (DCD) message. That is, the MBS zone can refer to a group of BSs that use the same CID or SA to provide MBS.

The MBS data to be provided to an MS is transmitted to all BSs located in an MBS zone supporting the same MBS, and the BSs transmit the MBS data to MSs according to channel information, so the MSs located in the MBS zone can receive the MBS data. To receive predetermined MBS data from the BS or to receive other MBS data while receiving the predetermined MBS data, the MS can change a Frequency Assignment (FA) of a channel allocated for transmission of the MBS data. In particular, when an arbitrary BS uses multiple FAs, because the BS does not broadcast the same MBS data at all of the FAs, the MS, to receive predetermined MBS data, should switch to a corresponding FA at which the predetermined MBS data is transmitted. For this, there is a need for inter-FA handover. That is, in the communication system supporting MBS, to seamlessly provide MBS requested by a user, there is a need for an inter-FA handover scheme for a channel allocated to provide MBS.

SUMMARY OF THE INVENTION

An object of the present invention is to address at least the problems and/or disadvantages and to provide at least the advantages described below. Accordingly, an object of the present invention is to provide a method and system for transmitting/receiving data in a communication system.

Another object of the present invention is to provide a data transmission/reception method and system for seamlessly providing MBS desired by a user in a communication system supporting MBS.

According to one aspect of the present invention, there is provided a method for providing service in a communication system including a first Base Station (BS) providing a first Multicast and Broadcast Service (MBS) to a Mobile Station (MS) located in a first MBS zone. A broadcast message, including information indicating whether any of at least one BS located in at least one MBS zone neighboring the first MBS zone can provide an MBS, is provided from the first BS to the MS. A request message for requesting a second MBS that is not supported by the first BS, is received by the first BS from the MS. A second BS in a second MBS zone supporting the second MBS is detected by the first BS from among the at least one MBS zone neighboring the first MBS zone. A response message including information indicating that the first BS cannot support the second MBS and identifier information of the second BS in the second MBS zone that supports the second MBS, is transmitted from the first BS to the MS.

According to another aspect of the present invention, there is provided a method for providing service in a communication system including a first Base Station (BS) providing a first Multicast and Broadcast Service (MBS) to a Mobile Station (MS) located in a first MBS zone. A broadcast message including information indicating whether any of at least one BS in at least one MBS zone neighboring a first MBS zone can provide an MBS, is received by the MS from the first BS. A request message for requesting a second MBS from the first BS, is transmitted by the MS. A response message, including information indicating that the first BS cannot support the second MBS and identifier information of a second BS in a second MBS zone supporting the requested second MBS, is received from the first BS.

According to a further aspect of the present invention, there is provided a system for providing service in a communication system. A base station (BS) located in a first Multicast and Broadcast Service (MBS) zone provides a first MBS to a Mobile Station (MS) located in the first MBS zone, transmits a broadcast message to the MS including information indicating whether any of at least one BS in at least one MBS zone neighboring the first MBS zone can provide an MBS, receives a request message for requesting a second MBS from the MS that is not supported by the base station, detects a second BS in a second MBS zone supporting the second MBS from among the at least one MBS zone neighboring the first MBS zone, and transmits to the MS a response message including information indicating that the BS cannot support the second MBS and identifier information of the second BS in the second MBS zone that supports the second MBS.

According to yet another aspect of the present invention, there is provided a system for providing service in a communication system. A mobile station (MS) receives a first Multicast and Broadcast Service (MBS) from a first Base Station (BS) in a first MBS zone, receives a broadcast message including information indicating whether any of at least one BS in at least one MBS zone neighboring the first MBS zone can provide an MBS, transmits a request message for requesting a second MBS to the first BS, and receives, from the first BS, a response message including information indicating that the first BS cannot support the second MBS and identifier information of a second BS in a second MBS zone supporting the requested second MBS.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
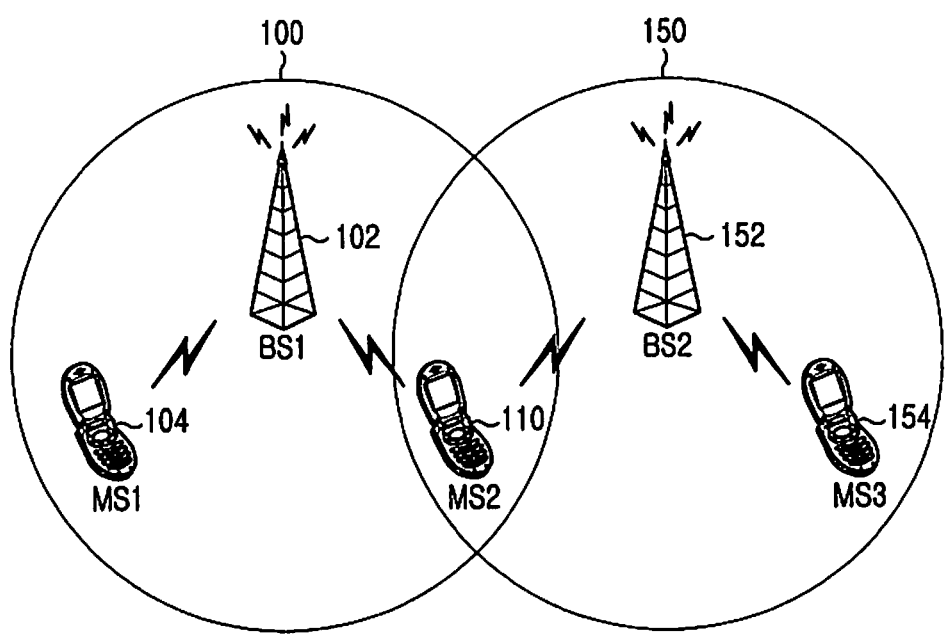
FIG. 1 is a system overview of a configuration of a general IEEE 802.16 communication system supporting MBS.

Preferred embodiments of the present invention will now be described in detail with reference to the annexed drawings. In the following description, a detailed description of known functions and configurations incorporated herein has been omitted for clarity and conciseness.

The present invention provides a method and system for providing service in a communication system, for example, the Institute of Electrical and Electronics Engineers (IEEE) 802.16 communication system, which is a Broadband Wireless Access (BWA) communication system. Although an embodiment of the present invention will be described herein with reference to an IEEE 802.16 communication system employing Orthogonal Frequency Division Multiplexing (OFDM)/Orthogonal Frequency Division Multiple Access (OFDMA) by way of example, the service provision method and system provided by the present invention can be applied to other communication systems.

In addition, the present invention provides a method and system for service provision between a transmitter, or a Base Station (BS), in charge of a service zone, and a receiver, or a Mobile Station (MS) having both mobility and fixability. The present invention also provides for receiving a communication service, or a Multicast and Broadcast Service (MBS), from the transmitter in a communication system. An embodiment of the present invention, described below, provides a service provision method and system in which an MS receives MBS from multiple BSs using a multi-BS access scheme in a communication system supporting MBS.

Unlike in single-BS access scheme where to receive MBS, an MS is registered in all BSs supporting the MBS, in the multi-BS access scheme, a connection for MBS between a BS and an MS is generated through a Dynamic Service Addition (DSA) process, or a service allocation process, and the MS acquires the connection information with the BS by receiving Type/Length/Value (TLV) encoding information for data identification from the BS. The MS can identify an MBS zone depending on a Connection Identifier (CID) or a Security Association (SA). The MBS zone as used herein refers to a zone where an MBS flow is available depending on the CID or the SA, i.e. a predetermined zone where the MS can receive MBS. The BS broadcasts information on the MBS zone to MSs over a Downlink Channel Descriptor (DCD) message. That is, the MBS zone can refer to a group of BSs that use the same CID or SA to provide MBS, in other words, to a group of BSs that provide the same MBS to users.

MBS data transmitted to an MS is transmitted from an MBS content server to all BSs located in a corresponding MBS zone via an MBS controller (MBSC), and when the BSs transmit the MBS data to MSs according to channel information, MSs located in the MBS zone receive a broadcast service, or MBS, by receiving the MBS data. To receive MBS by receiving predetermined MBS data from the BS or to receive another broadcast service, i.e. another MBS while receiving the predetermined MBS data, the MS can change a Frequency Assignment (FA) of a channel allocated for transmission of the MBS data. In addition, the MS can change the FA to thereby receive MBS by receiving the MBS data that a BS located in another MBS zone transmits.

When a user, or an MS, desires to receive another MBS other than the current MBS as described above, the present invention provides a service provision method and system for seamlessly providing MBS to an MS by allowing the MS to perform inter-FA handover. That is, the present invention provides an inter-FA handover scheme for allowing an MS receiving first MBS data over a first FA from a BS (serving BS) that is located in a first MBS zone and is in charge of the MS itself, to receive second MBS data over a second FA from a BS (target BS) located in a second MBS zone.

In order to allow the MS to receive its desired MBS data by performing inter-FA handover in this manner, the serving BS broadcasts a Mobile Neighbor Advertisement (MOB_NBR-ADV) message, or a broadcast message, to MSs located in its own MBS zone, and allows the MSs to receive their desired MBS by performing inter-FA handover through a DSA operation. A detailed description will now be made of an MOB_NBR-ADV message that the serving BS broadcasts to MSs located in its own MBS zone to allow the MSs to perform inter-FA handover in a communication system supporting MBS according to an embodiment of the present invention. Table 1 shows a format of an MOB_NBR-ADV message broadcasted to MSs for inter-FA handover in a communication system supporting MBS according to an embodiment of the present invention.

TABLE 1

| Syntax | Size | Note |
| --- | --- | --- |
| MOB_NBR-ADV message_Format | | |
| Management Message Type=49 | 8 bits | |
| Operator ID | 24 bits | Unique ID assigned to the operator |
| N_Neighbors | 8 bits | |
| For (j=0;<N<N_Neighbors;j++) { | | |
| Neighbor BS-ID | 48 bits | |
| DL Physical Frequency | 32 bits | |
| Configuration Change Count | 8 bits | Incremented each time the information on the associated neighbor BS has changed |
| TLV Encoded Neighbor Information | Variable | |
| } | | |
| HMAC | 21 bits | |
| } | | |

As shown in Table 1, the MOB_NBR-ADV message includes multiple Information Elements (IEs), i.e. a 'Management Message Type' field indicating a type of the transmission message, a 'Configuration Change Count' field indicating the number of changes in configuration, an 'N_Neighbors' field indicating the number of neighbor BSs, a 'Neighbor BS-ID' field indicating Identifiers (IDs) of the neighbor BSs, a 'DL Physical Frequency' field indicating physical channel frequency of the neighbor BS, and a 'TLV Encoded Neighbor Information' field indicating other information related to the neighbor BS.

The serving BS includes, in the 'TLV Encoded Neighbor Information' field of the MOB_NBR-ADV message, MBS Support information indicating whether it can provide MBS of neighbor BSs. More specifically, the 'TLV Encoded Neighbor Information' field of the MOB_NBR-ADV message can be shown in Table 2.

TABLE 2

| Name | Type (1 byte) | Length (1 byte) | Value |
| --- | --- | --- | --- |
| DCD_Setting | 1 | Variable | Compound TLV |
| UCD_Setting | 2 | Variable | Compound TLV |
| Neighbor BS Trigger | 4 | Variable | Compound TLV |
| MBS Support | 5 | 1 | MBS Support Indication |

Figure 2:
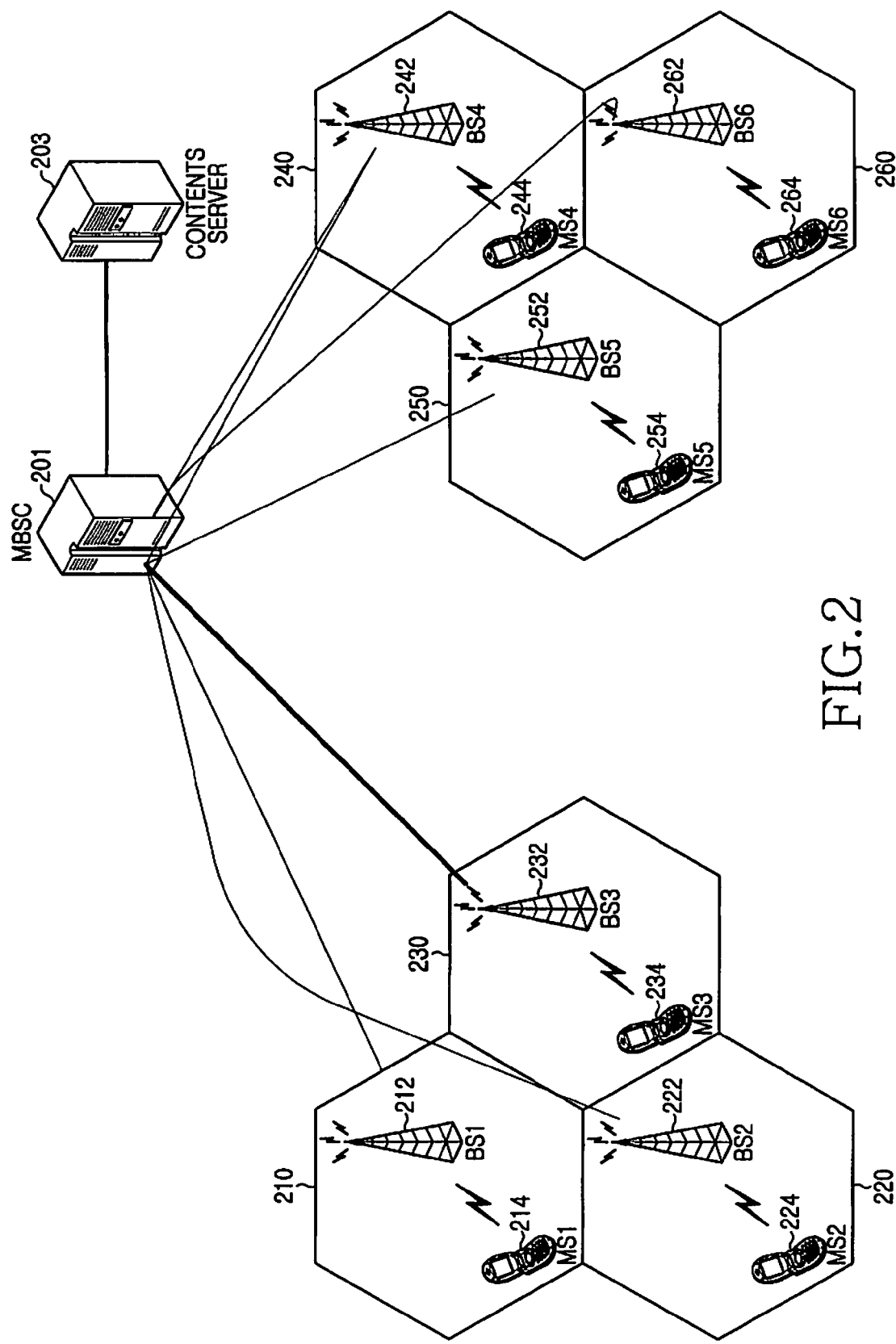
FIG. 2 is a system diagram illustrating a configuration of a communication system according to the present invention.

As shown in Table 2, the 'TLV Encoded Neighbor Information' field includes a 'DCD_setting' field indicating a TLV value included in a DCD message, a 'UCD_setting' field indicating a TLV value included in an Uplink Channel Descriptor (UCD) message, a 'Neighbor BS trigger' field indicating triggering of neighbor BSs, and an 'MBS support' field indicating MBS supportability of the neighbor BSs. That is, the 'MBS support' field indicates whether the neighboring BSs can provide MBS over a channel allocated to provide MBS, and an MS can determine if it can receive MBS from the neighbor BSs, after checking MBS support information included in the MBS support field. Accordingly, the MS, if it desires to receive another MBS while receiving MBS from the serving BS, determines if the neighboring BSs can provide MBS, depending on the checked MBS support information, and determines if the serving BS can provide the desired MBS by performing a DSA operation. If it is determined that the serving BS cannot provide the desired MBS, the MS performs handover to a BS that can provide the desired MBS. With reference to FIG. 2, a description will now be made of a configuration of a communication system according to the present invention.

FIG. 2 is a system diagram illustrating a configuration of a communication system according to the present invention.

Referring to FIG. 2, the communication system has a multi-cell configuration, i.e. has a cell #1 210, a cell #2 220, a cell #3 230, a cell #4 240, a cell #5 250, and a cell #6 260, and includes a BS1 212, a BS2 222, a BS3 232, a BS4 242, a BS5 252 and a BS6 262 in charge of their associated cells 210, 220, 230, 240, 250 and 260; an MS1 214, an MS2 224, an MS3 234, an MS4 244, an MS5 254 and an MS6 264, which are located in their associated cells 210, 220, 230, 240, 250 and 260 and receive a communication service, or MBS, from their associated BSs 212, 222, 232, 242, 252 and 262; an MBS content server 203 for generating MBS data used for providing MBS to the MSs 214, 224, 234, 244, 254 and 264; and an MBSC 201 for transmitting the MBS data generated in the MBS content server 203 to corresponding BSs located in each MBS zone. As described above, it will be assumed herein that the MSs of MS1 214, MS2 224, MS3 234, MS4 244, MS5 254 and MS6 264 have both mobility and fixability, and signal exchange between the BSs 212, 222, 232, 242, 252 and 262, and the MSs 214, 224, 234, 244, 254 and 264 located in the cells 210, 220, 230, 240, 250 and 260 is achieved using OFDM/OFDMA. In addition, it will be assumed that a group composed of cell #1 210, cell #2 220 and cell #3 230, or BS1 212, BS2 222 and BS3 232, is defined as a first MBS zone, i.e. BS1 212, BS2 222 and BS3 232 provide the same MBS to the MSs, and a group composed of cell #4 240, cell #5 250 and cell #6 260, or BS4 242, BS5 252 and BS6 262 is defined as a second MBS zone, i.e. BS4 242, BS5 252, BS6 262 provide the same MBS to the MSs. MBSC 201 transmits the MBS information provided from each MBS zone, e.g. MBS type information and information of the BSs located in each MBS zone, i.e. BS ID so that BSs located in each MBS zone can recognize the MBS information. And the BSs share information of broadcasting channel through a backbone network.

More specifically, BS1 212, BS2 222 and BS3 232 in charge of the first MBS zone, i.e. of cell #1 210, cell #2 220 and cell #3 230, broadcast the same MBS data, or provide the same MBS, to MSs over a first FA including 3 broadcast channels, and BS4 242, BS5 252 and BS6 262 in charge of the second MBS zone, i.e. of cell #4 240, cell #5 250 and cell #6 260, broadcast the same MBS data, or provide the same MBS, to MSs over a second FA including 3 broadcast channels. For convenience, it will be assumed herein that in the first MBS zone, the first broadcast channel, the second broadcast channel and the third broadcast channel of the first FA are animation channel, sports channel and drama channel, respectively, and in the second MBS zone, the fourth broadcast channel, the fifth broadcast channel and the sixth broadcast channel of the second FA are movie channel, music channel and game channel, respectively.

When MS3 234, which is located in cell #3 230 and receives animation MBS data from BS3 232 over the first broadcast channel of the first FA, or over the animation channel, desires to receive game MBS data, MS3 234 performs handover to the second FA, or performs inter-FA handover to receive an MBS service provided in a different MBS zone, and then receives the desired MBS by receiving game MBS data over the sixth broadcast channel of the second FA, or over the game channel. When BS3 232, or the serving BS of MS3 234, receives from MBSC 201 information on the MBS supportable by neighboring BSs, or supportable by BSs that provide MBS in the second MBS zone different from its own MBS zone, or the first MBS zone, BS3 232 generates a MOB_NBR-ADV message including received MBS support information indicating MBS supportability of BSs located in the second MBS zone, and then broadcasts the generated MOB_NBR-ADV message to MS3 234. Upon receipt of the MOB_NBR-ADV message, MS3 234 acquires information on the BS that can provide MBS thereto, performs a DSA operation to determine if BS3 232, or the serving BS, can provide the MBS that MS3 234 itself desires to receive, and then receives the desired MBS from BS3 232, if BS3 232 can provide the MBS. When BS3 232, or the serving BS, cannot provide the MBS that MS3 234 desires to receive, it allows MS3 234 to perform handover to the BS that provides the desired MBS.

For example, while receiving animation MBS from BS3 232 over the first broadcast channel of the first FA, MS3 234 receives a MOB_NBR-ADV message from BS3 232 and determines if there are neighboring BSs supporting MBS. MS3 234, if it desires to receive sports MBS, transmits a request for sports MBS using a DSA-Request (DSA-REQ) message, and because the sports MBS is MBS supportable in the first MBS zone, i.e. because the sports MBS is MBS that BS3 232 can provide over the second broadcast channel of the first FA, BS3 232 provides the MBS desired by MS3 234 through a change in the broadcast channel in the first FA without inter-FA handover.

While receiving animation MBS from BS3 232 over the first broadcast channel of the first FA, if MS3 234 desires to receive game MBS, it transmits a request for game MBS to BS3 232 over a DSA-REQ message. In this case, BS3 232 recognizes that the game MBS is MBS provided in the second MBS zone other than the first MBS zone, i.e. recognizes that BS3 232 itself cannot provide game MBS and can provide the game MBS in the second MBS zone using MBS information of each MBS zone from MBSC 201. In response to the request, BS3 232 transmits information indicating its unsupportability of the game MBS requested by MS3 234 and BS information indicating a BS capable of providing the requested game MBS, for example, BS ID of the BS located in the second MBS zone. That is, BS3 232, because it cannot provide the game MBS, recommends the BS capable of providing the game MBS, or transmits information on the target BS to which MS3 234 should perform handover to receive the game MBS.

Figure 3:
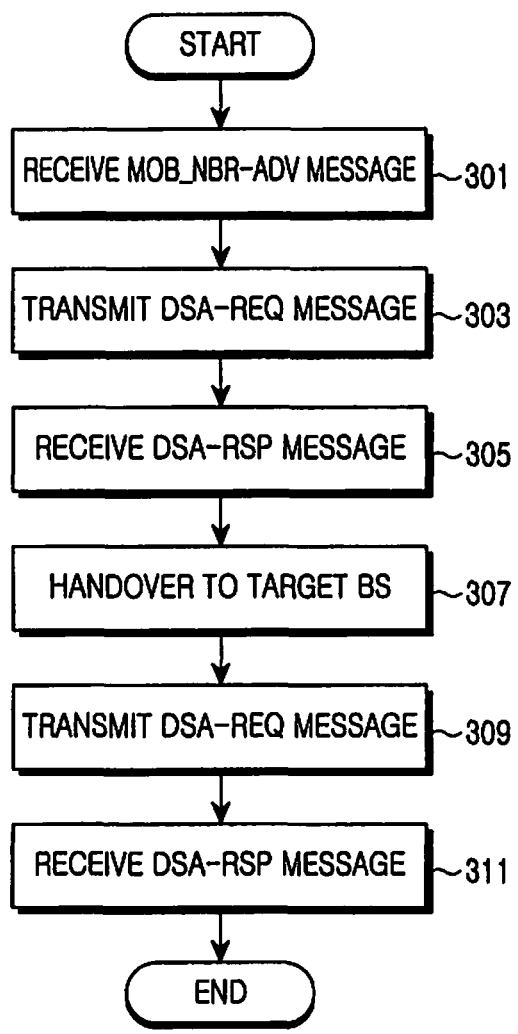
FIG. 3 is a flowchart of an operation of an MS in a communication system supporting MBS according to the present invention.

Upon receipt of the response to the DSA-REQ message from BS3 232, MS3 234 performs handover according to the BS information indicating the BS capable of providing the game MBS, received from BS3 232, i.e. performs inter-FA handover to receive MBS provided in the second MBS zone, in other words, performs handover from the first FA to the second FA, and then receives the game MBS over the sixth broadcast channel of the second FA. With reference to FIG. 3, a description will now be made of an operation of an MS in a communication system supporting MBS according to the present invention.

FIG. 3 is a flowchart of an operation of an MS in a communication system supporting MBS according to the present invention.

Referring to FIG. 3, in step 301, the MS receives from a serving BS a MOB_NBR-ADV message including MBS support information indicating MBS supportability of neighbor BSs. In step 303, the MS transmits a DSA-REQ message to the serving BS to generate a connection over which it will receive predetermined MBS. In response to the DSA-REQ message transmitted to the serving BS in step 303, the MS receives a DSA-Response (DSA-RSP) message from the serving BS in step 305. The received DSA-RSP message includes information on the BS capable of providing the predetermined MBS desired by the MS itself. For convenience, it will be assumed herein that the DSA-RSP message that the MS has received in step 305 includes information indicating that the serving BS cannot provide the predetermined MBS desired by the MS, and BS information indicating the BS capable of providing the predetermined MBS.

For example, while receiving animation MBS from the serving BS over the first broadcast channel of the first FA, if an MS located in the first MBS zone desires to receive game MBS, the MS transmits a DSA-REQ message to the serving BS to receive the game MBS. Then the serving BS, because it cannot provide the game MBS requested by the MS, transmits to the MS a DSA-RSP message including information indicating its unsupportability of the requested game MBS, and BS information, or BS ID, of the second MBS zone where the game MBS is supportable.

In the communication system according to the present invention, if the MS transmits a DSA-REQ message to the serving BS to receive MBS, the serving BS transmits a DSA-RSP message to the MS in response to the DSA-REQ message, and a 'TLV Encoding' field of the DSA-RSP message can be shown in Table 3. Wherein the DSA-REQ message can include 'TLV Encoding' field be shown in Table 3.

TABLE 3

| Name | Type | Length (1 byte) | Value | Scope |
|---|---|---|---|---|
| Recommended MBS support BS ID | — | 6 | BS ID of supporting to requested channel | DSA-REQ, DSA-RSP |

In Table 3, a 'Recommended MBS support BS ID' field added to the 'TLV Encoding' field of the DSA-RSP message includes BS information indicating the BS capable of providing MBS desired by the MS, i.e. BS information of an MBS zone supporting the desired MBS to allow the MS to perform handover to the MBS zone to receive the desired MBS. In other words, while receiving MBS from the serving BS in the current MBS zone, if the MS desires to receive MBS unsupportable in the current MBS zone, or desires to receive MBS that the serving BS cannot provide, the serving BS transmits information on the BS capable of providing the desired MBS to the MS using the 'Recommended MBS support BS ID' field, to provide information on the target BS to which the MS will perform handover.

Thereafter, in step 307, the MS recognizes that the serving BS cannot provide its desired MBS depending on the DSA-RSP message received from the serving BS, acquires information on the target BS supporting its desired MBS depending on BS information included in the 'Recommended MBS support BS ID' field of the DSA-RSP message, and then performs handover to the target BS. An operation in which the MS performs handover to the target BS will be described in detail later.

Figure 4:
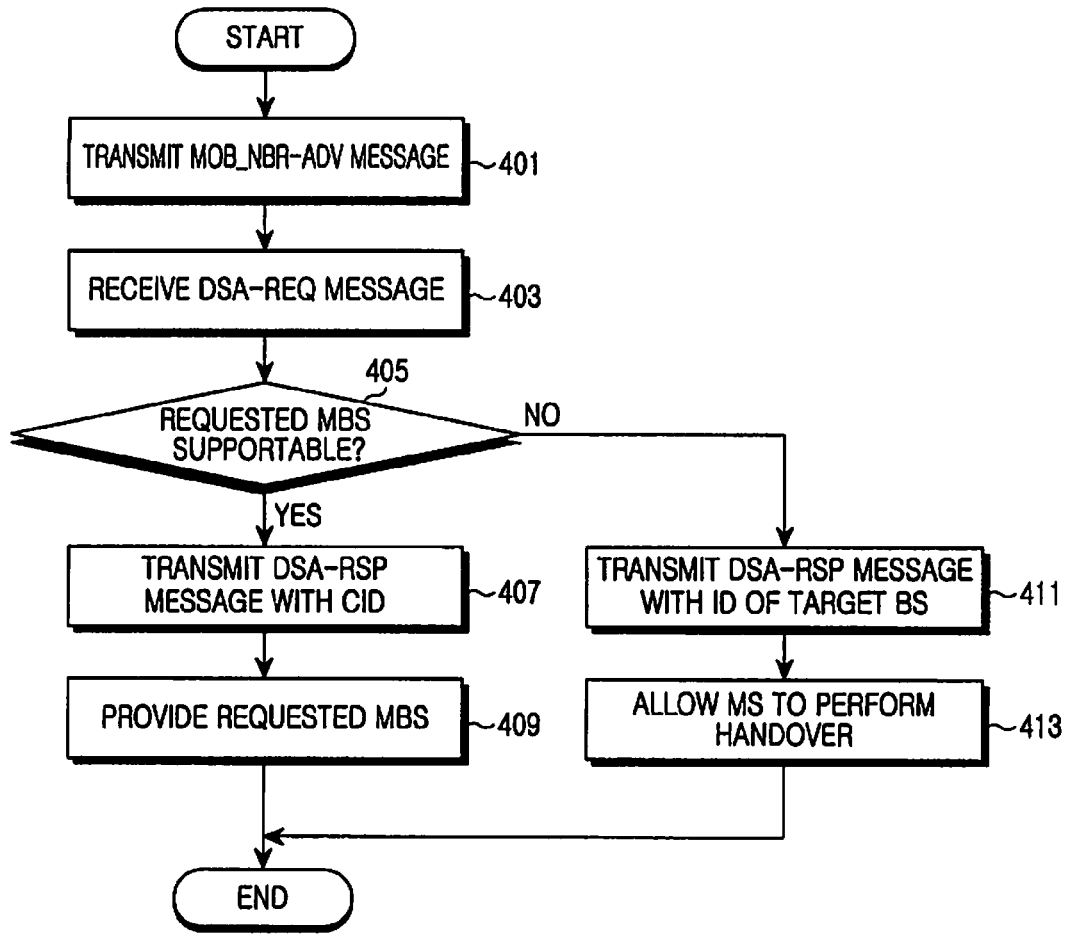
FIG. 4 is a flowchart of an operation of a serving BS in a communication system supporting MBS according to the present invention.

After performing handover to the target BS in step 307, the MS transmits a DSA-REQ message for requesting the desired MBS to the target BS in step 309. Thereafter, in step 311, the MS receives a DSA-RSP message from the target BS in response to the DSA-REQ message, so a connection for the desired MBS is generated and the MS received the desired MBS over the connection via the target BS. For example, as described above, the MS located in the second MBS zone recognizes the BS capable of providing game MBS over the sixth broadcast channel of the second FA by checking BS information included in the 'Recommended MBS support BS ID' field of the DSA-RSP message, performs handover to the recognized BS, and performs a DSA operation with the BS to which it has performed handover, thereby receiving the game MBS. With reference to FIG. 4, a description will now be made of an operation of a serving BS in a communication system supporting MBS according to an embodiment of the present invention.

FIG. 4 is a flowchart of an operation of a serving BS in a communication system supporting MBS according to the present invention.

Referring to FIG. 4, in step 401, the serving BS generates a MOB_NBR-ADV message depending on information on neighbor BSs received from an MBSC, or depending on information on the MBS supported by the neighbor BSs, and transmits, or broadcasts, the generated MOB_NBR-ADV message to MSs. Thereafter, in step 403, the serving BS receives a DSA-REQ message for requesting desired MBS from an MS located in its own MBS zone. The serving BS determines in step 405 whether it can provide the MBS requested by the MS, or whether it can generate a connection used for providing the MBS requested by the MS through a DSA operation.

If it is determined in step 405 that the serving BS itself can provide the MBS requested by the MS, the serving BS proceeds to step 407 where it transmits to the MS a DSA-RSP message including connection identification information, or CID, for providing the MBS requested by the MS. In step 409, the serving BS generates a connection used for providing MBS to the MS that has received the DSA-RSP message, and then provides MBS to the MS.

Figure 5:
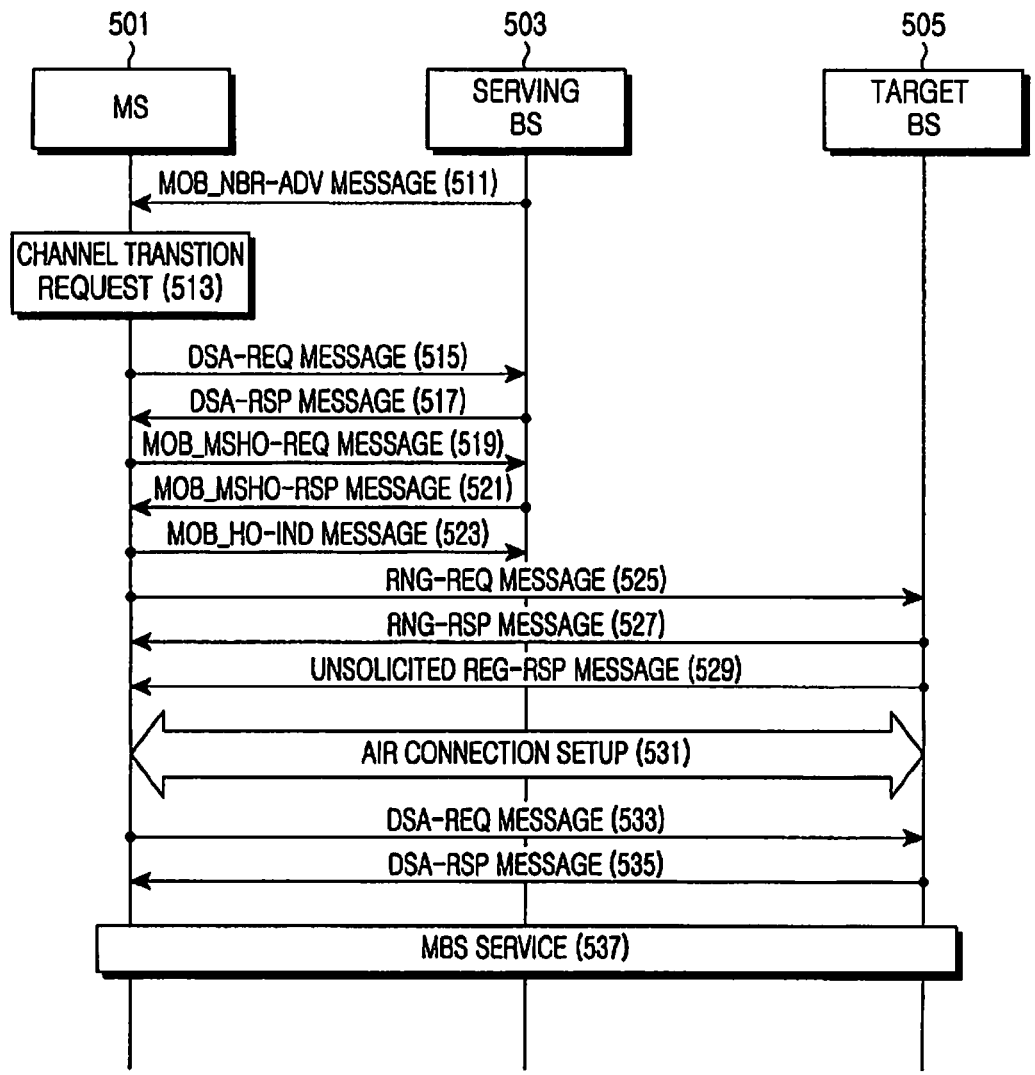
FIG. 5 is a flow diagram of a signal transmission/reception flow in a communication system supporting MBS according to the present invention.

However, if it is determined in step 405 that the serving BS itself cannot provide the MBS requested by the MS, the serving BS proceeds to step 411 where it includes identification information of a target BS capable of providing the MBS requested by the MS, i.e. an ID of the target BS, in the 'Recommended MBS support BS ID' field of the DSA-RSP message, and then transmits to the MS the DSA-RSP message including the identification information of the target BS capable of providing the MBS requested by the MS. In step 413, the serving BS allows an MS receiving the DSA-RSP message to perform handover to the target BS, and to receive its desired MBS from the target BS. After transmitting the DSA-RSP message with an ID of the target BS, the serving BS recognizes the BS capable of providing the MBS desired by the MS depending on information on the neighbor BSs received from the MBSC, or depending on information on the MBS supportable by the neighbor BSs, and includes information on the recognized BS in the Recommended MBS support BS ID' field of the DSA-RSP message. With reference to FIG. 5, a detailed description will now be made of a signal transmission/reception flow in a communication system supporting MBS according to an embodiment of the present invention.

FIG. 5 is a flow diagram of a signal transmission/reception flow in a communication system supporting MBS according to the present invention. Shown in FIG. 5 is a signal transmission/reception flow for the case where a serving BS cannot provide MBS requested by an MS in the communication system.

Referring to FIG. 5, in step 511, a serving BS 503 generates a MOB_NBR-ADV message depending on information on neighbor BSs received from an MBSC, or depending on information on the MBS supportable by the neighbor BSs, and then transmits, or broadcasts, the generated MOB_NBR-ADV message to MSs. If an MS 501 receiving the MOB_NBR-ADV message desires in step 513 to receive second MBS different from first MBS that it is currently receiving from serving BS 503, or if MS 501 switches from a channel of a first FA supporting the first MBS to a channel of a second FA supporting the second MBS, MS 501 transmits in step 515 a DSA-REQ message to serving BS 503 to receive the second MBS. Serving BS 503, because it cannot provide the second MBS as described above, includes in step 517 identification information of a target BS 505 capable of providing the second MBS requested by MS 501, or an ID of target BS 505, in a 'Recommended MBS support BS ID' field of the DSA-RSP message, and then transmits to MS 501 the DSA-RSP message including the information on the BS capable of providing the second MBS.

Then MS 501 performs a handover operation to target BS 505 according to the BS information included in the 'Recommended MBS support BS ID' field of the DSA-RSP message. More specifically, MS 501 transmits a Mobile_MSHandover-Request (MOB_MSHO-REQ) message to the serving BS 503 to perform handover to target BS 505 in step 519. Upon receipt of the MOB_MSHO-REQ message, serving BS 503 transmits a Mobile_MSHandover-Response (MOB_MSHO-RSP) message to MS 501 in response to the MOB_MSHO-REQ message in step 521. Upon receipt of the MOB_MSHO-RSP message, MS 501 transmits in step 523 to serving BS 503 a Mobile_Handover-Indication (MOB_HO-IND) message indicating the target BS 505 to which it will perform handover in response to the MOB_MSHO-RSP message. Upon receipt of the MOB_HO-IND message from MS 501, serving BS 503 releases the wireless access channel to MS 501.

Thereafter, the MS 501 performs a ranging procedure with the target BS 505. That is, the MS 501 transmits a Ranging-Request (RNG-REQ) message to the target BS 505 in step 525. The target BS 505 transmits a Ranging-Response (RNG-RSP) message to the MS 501 in response to the received RNG-REQ message in step 527. Thereafter, the target BS 505 transmits an Unsolicited Registration-Response (REG-RSP) message to the MS 501 in step 529. Then an air connection between the MS 501 and the target BS 505 is set up in step 531, and the MS 501 transmits a DSA-REQ message to the target BS 505 to generate a connection used for receiving the second MBS in step 533. Thereafter, target BS 505 transmits to MS 501 a DSA-RSP message including connection identification information, or CID, used for providing the second MBS in step 535. Thereafter, target BS 505 generates a connection used for providing the second MBS, to MS 501 that has received the DSA-RSP message, and then provides the second MBS to MS 501 in step 537.

As is apparent from the present invention, in the communication system, the BS transmits a message including information on the communication service supported by neighbor BSs to MSs, thereby seamlessly providing a communication service desired by the MSs to the MSs.

While the invention has been shown and described with reference to a certain preferred embodiment thereof, it will be understood by those skilled in the art that various changes in form and details may be made therein without departing from the spirit and scope of the invention as further defined by the appended claims.

What is claimed is:

1. A method for providing service in a communication system including a first Base Station (BS) and a Mobile Station (MS) located in a first Multicast and Broadcast Service (MBS) zone, the method comprising:
    transmitting, from the first BS to the MS, a broadcast message including information indicating whether any of at least one BS located in at least one MBS zone neighboring the first MBS zone can provide an MBS, wherein the first BS provides a first MBS to the MS;
    receiving, by the first BS from the MS, a request message for requesting a second MBS that is not supported by the first BS, the first MBS and the second MBS being for different services;
    detecting, by the first BS, a second BS in a second MBS zone supporting the second MBS from among the at least one MBS zone neighboring the first MBS zone; and
    transmitting, from the first BS to the MS, a response message including information indicating that the first BS cannot support the second MBS and identifier information of the second BS in the second MBS zone that supports the second MBS,
    wherein the first BS remains capable of supporting the first MBS for the MS,
    wherein the broadcast message includes information related to the neighbor BSs, and
    wherein the information related to the neighbor BSs includes information indicating a Type, Length, Value (TLV) value included in a Downlink Channel Descriptor (DCD) message, information indicating a TLV value included in an Uplink Channel Descriptor (UCD) message, information indicating triggering of the neighbor BSs, and the information indicating whether any of the at least one BS can provide the MBS included in the information related to the neighbor BSs, each having a TLV form.

2. The method of claim 1, further comprising:
    performing handover, by the MS, from a Frequency Assignment (FA) of the first MBS zone to an FA of the second MBS zone based on the response message; and
    providing, by the second BS in the second MBS zone, the second MBS to the MS.

3. The method of claim 1, further comprising:
    performing handover, by the MS, to the second BS in the second MBS zone based on the response message; and
    providing, by the second BS in the second MBS zone, the second MBS to the MS.

4. The method of claim 1, wherein the request message is a Dynamic Service Addition-Request (DSA-REQ) message, and the response message is a Dynamic Service Addition-Response (DSA-RSP) message.

5. The method of claim 1, wherein the broadcast message is a Mobile Neighbor Advertisement (MOB_NBR-ADV) message.

6. The method of claim 1, wherein the broadcast message further includes at least one of information indicating a type of received message, information indicating a number of neighbor BSs, information indicating a number of changes in configuration of each of the neighbor BSs, information indicating an identifier of the each of the neighbor BSs, and information indicating a physical channel frequency of each of the neighbor BSs.

7. The method of claim 1, wherein the identifier information of the second BS in the second MBS zone has a Type, Length, Value (TLV) form.

8. The method of claim 1, wherein the first BS is incapable of supporting the second MBS.

9. A method for providing service in a communication system including a first Base Station (BS) and a Mobile Station (MS) located in a first Multicast and Broadcast Service (MBS) zone, the method comprising:
    receiving, by the MS from the first BS, a broadcast message including information indicating whether any of at least one BS in at least one MBS zone neighboring a first MBS zone can provide an MBS, wherein the first BS provides a first MBS to the MS;
    transmitting, by the MS, a request message for requesting a second MBS from the first BS, the first MBS and the second MBS being for different services; and
    receiving, from the first BS, a response message including information indicating that the first BS cannot support the second MBS and identifier information of a second BS in a second MBS zone supporting the requested second MBS,
    wherein the first BS remains capable of supporting the first MBS for the MS,
    wherein the broadcast message includes information related to the neighbor BSs, and
    wherein the information related to the neighbor BSs includes information indicating a Type, Length, Value (TLV) value included in a Downlink Channel Descriptor (DCD) message, information indicating a TLV value included in an Uplink Channel Descriptor (UCD) message, information indicating triggering of the neighbor BSs, and the information indicating whether any of the at least one BS can provide the MBS included in the information related to the neighbor BSs, each having a TLV form.

10. The method of claim 9, further comprising:
    performing handover, by the MS, from a Frequency Assignment (FA) of the first MBS zone to an FA of the second MBS zone, based on the response message; and
    receiving, by the MS, the second MBS from the second BS.

11. The method of claim 9, further comprising:
    performing handover, by the MS, to the second BS, based on the response message; and
    receiving, by the MS, the second MBS from the second BS.

12. The method of claim 9, wherein the request message is a Dynamic Service Addition-Request (DSA-REQ) message, and the response message is a Dynamic Service Addition-Response (DSA-RSP) message.

13. The method of claim 9, wherein the broadcast message is a Mobile Neighbor Advertisement (MOB_NBR-ADV) message.

14. The method of claim 9, wherein the broadcast message further includes at least one of information indicating a type of received message, information indicating a number of neighbor BSs, information indicating a number of changes in configuration of each of the neighbor BSs, information indicating an identifier of each of the neighbor BSs, and information indicating a physical channel frequency of each of the neighbor BSs.

15. The method of claim 9, wherein the identifier information of the second BS in the second MBS zone has a Type, Length, Value (TLV) form.

16. The method of claim 9, wherein the first BS is incapable of supporting the second MBS.

17. A system for providing service in a communication system, the system comprising:
a base station (BS) located in a first Multicast and Broadcast Service (MBS) zone for providing a first MBS to a Mobile Station (MS) located in the first MBS zone, transmitting a broadcast message to the MS including information indicating whether any of at least one BS in at least one MBS zone neighboring the first MBS zone can provide an MBS, receiving a request message for requesting a second MBS from the MS that is not supported by the base station, the first MBS and the second MBS being for different services, detecting a second BS in a second MBS zone supporting the second MBS from among the at least one MBS zone neighboring the first MBS zone, and transmitting to the MS a response message including information indicating that the BS cannot support the second MBS and identifier information of the second BS in the second MBS zone that supports the second MBS,
wherein the BS remains capable of supporting the first MBS for the MS,
wherein the broadcast message includes information related to the neighbor BSs, and
wherein the information related to the neighbor BSs includes information indicating a Type, Length, Value (TLV) value included in a Downlink Channel Descriptor (DCD) message, information indicating a TLV value included in an Uplink Channel Descriptor (UCD) message, information indicating triggering of the neighbor BSs, and the information indicating whether any of the at least one BS can provide the MBS included in the information related to the neighbor BSs, each having a TLV form.

18. The system of claim 17, wherein the MS performs handover from a Frequency Assignment (FA) of the first MBS zone to an FA of the second MBS zone based on the response message, and the second BS in the second MBS zone provides the second MBS to the MS.

19. The system of claim 17, wherein the MS performs handover to the second BS in the second MBS zone based on the response message, and the second BS in the second MBS zone provides the second MBS to the MS.

20. The system of claim 17, wherein the request message comprises a Dynamic Service Addition-Request (DSA-REQ) message, and the response message comprises a Dynamic Service Addition-Response (DSA-RSP) message.

21. The system of claim 17, wherein the broadcast message comprises a Mobile Neighbor Advertisement (MOB_NBR-ADV) message.

22. The system of claim 17, wherein the identifier information of the second BS in the second MBS zone has a Type, Length, Value (TLV) form.

23. The system of claim 17, wherein the first BS is incapable of supporting the second MBS.

24. The system of claim 17, wherein the broadcast message further comprises at least one of information indicating a type of received message, information indicating a number of neighbor BSs, information indicating a number of changes in configuration of each of the neighbor BSs, information indicating an identifier of each of the neighbor BSs, and information indicating a physical channel frequency of each of the neighbor BSs.

25. A system for providing service in a communication system, the system comprising:
a mobile station (MS) for receiving a first Multicast and Broadcast Service (MBS) from a first Base Station (BS) in a first MBS zone, receiving a broadcast message including information indicating whether any of at least one BS in at least one MBS zone neighboring the first MBS zone can provide an MBS, transmitting a request message for requesting a second MBS to the first BS, the first MBS and the second MBS being for different services, and receiving, from the first BS, a response message including information indicating that the first BS cannot support the second MBS and identifier information of a second BS in a second MBS zone supporting the requested second MBS,
wherein the first BS remains capable of supporting the first MBS for the MS,
wherein the broadcast message includes information related to the neighbor BSs, and
wherein the information related to the neighbor BSs includes information indicating a Type, Length, Value (TLV) value included in a Downlink Channel Descriptor (DCD) message, information indicating a TLV value included in an Uplink Channel Descriptor (UCD) message, information indicating triggering of the neighbor BSs, and the information indicating whether any of the at least one BS can provide the MBS included in the information related to the neighbor BSs, each having a TLV form.

26. The system of claim 25, wherein the MS performs handover from a Frequency Assignment (FA) of the first MBS zone to an FA of the second MBS zone based on the response message, and receives the second MBS from the second BS.

27. The system of claim 25, wherein the MS performs handover to the second BS based on the response message, and receives the second MBS from the second BS.

28. The system of claim 25, wherein the request message comprises a Dynamic Service Addition-Request (DSA-REQ) message, and the response message comprises a Dynamic Service Addition-Response (DSA-RSP) message.

29. The system of claim 25, wherein the broadcast message comprises a Mobile Neighbor Advertisement (MOB_NBR-ADV) message.

30. The system of claim 25, wherein the broadcast message further comprises at least one of information indicating a type of received message, information indicating a number of neighbor BSs, information indicating a number of changes in configuration of each of the neighbor BSs, information indicating an identifier of each of the neighbor BSs, and information indicating a physical channel frequency of each of the neighbor BSs.

31. The system of claim 25, wherein the identifier information of the second BS in the second MBS zone has a Type, Length, Value (TLV) form.

32. The system of claim 25, wherein the first BS is incapable of supporting the second MBS.

* * * * *